(12) United States Patent
Sugashima (10) Patent No.: US 11,444,891 B2
(45) Date of Patent: Sep. 13, 2022

(54) ELECTRONIC CONTROL UNIT, ABNORMALITY DETERMINATION PROGRAM, AND ABNORMALITY DETERMINATION METHOD

(71) Applicant: DENSO CORPORATION, Kariya (JP)

(72) Inventor: Takeshi Sugashima, Kariya (JP)

(73) Assignee: DENSO CORPORATION, Kariya (JP)

( * ) Notice: Subject to any disclaimer, the term of this patent is extended or adjusted under 35 U.S.C. 154(b) by 46 days.

(21) Appl. No.: 16/940,490

(22) Filed: Jul. 28, 2020

(65) Prior Publication Data

US 2021/0036971 A1 Feb. 4, 2021

(30) Foreign Application Priority Data

Aug. 1, 2019 (JP) .............................. JP2019-142232

(51) Int. Cl.
*H04L 49/90* (2022.01)
*H04L 9/40* (2022.01)
*H04L 43/0823* (2022.01)
*H04L 67/12* (2022.01)

(52) U.S. Cl.
CPC ...... *H04L 49/9084* (2013.01); *H04L 43/0847* (2013.01); *H04L 63/1425* (2013.01); *H04L 67/12* (2013.01)

(58) Field of Classification Search
CPC . H04L 49/9084; H04L 63/1425; H04L 47/32; H04L 43/0847; H04L 43/16; H04L 67/12; H04L 47/20

See application file for complete search history.

(56) References Cited

U.S. PATENT DOCUMENTS

2014/0256278 A1    9/2014  Ko et al.
2014/0328352 A1   11/2014  Mabuchi et al.

FOREIGN PATENT DOCUMENTS

| JP | 2009-253557 A | 10/2009 |
| JP | 5664799 B2 | 2/2015 |
| JP | 2017-126989 A | 7/2017 |
| WO | WO-2013094072 A1 | 6/2013 |

OTHER PUBLICATIONS

R. Pan etc., IETF RFC 8033, Feb. 2017 (Year: 2017).*

* cited by examiner

*Primary Examiner* — Jianye Wu
(74) *Attorney, Agent, or Firm* — Harness, Dickey & Pierce, P.L.C.

(57) ABSTRACT

An electronic control unit includes a receiver that receives a data frame transmitted at given transmission periods from a transmission source electronic control unit connected via a communication network, a buffer capable of storing the data frame, a writer that writes the data frame received by the receiver into the buffer, and an abnormality determiner that determines that the data frame is abnormal when the number of data frames written into the buffer exceeds a given threshold or when the data frame is written in excess of a capacity of the buffer.

15 Claims, 9 Drawing Sheets

ELECTRONIC CONTROL UNIT, ABNORMALITY DETERMINATION PROGRAM, AND ABNORMALITY DETERMINATION METHOD

CROSS-REFERENCE TO RELATED APPLICATION

The present application is based on Japanese Patent Application No. 2019-142232 filed on Aug. 1, 2019, disclosure of which is incorporated herein by reference.

TECHNICAL FIELD

The present disclosure relates to an electronic control unit (abbreviated as ECU) and in particular relates to an ECU for a vehicle.

BACKGROUND

ECUs of various types are mounted to an automobile. These ECUs are connected via a communication network to constitute an in-vehicle system. In such an in-vehicle system, a network intrusion detection system (NIDS) may be used to detect an abnormality such as a suspicious access from outside, an unauthorized data frame and the like.

SUMMARY

In some aspects, the present disclosure provides an electronic control unit that can reduce a load associated with abnormality detection. An example of the electronic control unit comprises: a receiver that receives a data frame transmitted at given transmission periods from a transmission source electronic control unit connected via a communication network; a buffer capable of storing the data frame; a writer that writes the data frame received by the receiver into the buffer; a reader that reads the data frame stored in the buffer at given reading periods and deletes the read data frame from the buffer; and an abnormality determiner that determines that the data frame is abnormal when the number of data frames written into the buffer and not deleted yet from the buffer exceeds a given threshold or when the data frame is written in excess of a capacity of the buffer,

BRIEF DESCRIPTION OF DRAWINGS

Objects, features and advantages of the present disclosure will become more apparent from the following detailed description made with reference to the accompanying drawings. In the drawings.

DETAILED DESCRIPTION

With regard to an in-vehicle system provided with a network intrusion detection system (NIDS) for detecting an abnormality such as a suspicious access from outside, an unauthorized data frame and the like, there is a first technology. In the first technology, a communication system is capable of determining whether messages communicated in the communication system are correct or incorrect. In this communication system, a plurality of ECUs are connected to a communication bus for communications with messages. A prescribed communication interval is set for each ECU, and the ECU transmits the messages based on the prescribed communication interval. Then, when the communication interval of the received messages is shorter than a specified communication interval, it is determined that the messages are not normal.

There is a second technology in which a relay connection unit relays messages transmitted and received between ECUs. In this relay connection unit, the number of times of reception of messages within a preset time is counted. When the number of times of reception exceeds a preset number of times, it is determined that the messages are not normal.

In order to detect an abnormality in data frame transmitted and received in a communication network of an in-vehicle system, it may be desirable to perform an abnormality detection process on all of data frames received by an electronic control unit. In this case, for monitoring a reception interval and/or a reception frequency, it may be necessary to perform such processes on all of the data frames as obtaining a reception time difference and aggregating the number of data frames. There is a concern that a software and/or hardware processing load of the electronic control unit is high.

It is an object of the present disclosure to provide an electronic control unit that performs abnormality detection on data frame while reducing a hardware and/or software processing load.

In an aspect of the present disclosure, an electronic control unit comprises: a receiver that receives a data frame transmitted at given transmission periods from a transmission source electronic control unit connected via a communication network; a buffer capable of storing the data frame; a writer that writes the data frame received by the receiver into the buffer; a first abnormality determiner that determines that the data frame is abnormal when the number of data frames written into the buffer exceeds a given threshold or when the data frame is written in excess of a capacity of the buffer; a reader that reads the data frame stored in the buffer at given reading periods and deletes the read data frame from the buffer; and a second abnormality determine that performs an abnormality detection process on the data frame that is not determined as abnormal by the first abnormality determiner, for determining that there is an abnormality in the data frame. The threshold or the capacity is set based on a maximum number of times the receiver receives, within the reading period, the data frame transmitted at the transmission periods.

This electronic control unit can reduce a load associated with abnormality detection, by; simply performing a data frame abnormality determination using a buffer which temporarily stores a received data frame; and by performing an abnormality detection process only on a data frame that is not determined as abnormal by the abnormality determination.

In another aspect of the present disclosure, an electronic control unit comprises; a receiver that receives a data frame transmitted at given transmission periods from a transmission source electronic control unit connected via a communication network; a buffer capable of storing the data frame; a writer that writes the data frame received by the receiver into the buffer; a reader that reads the data frame stored in the buffer at given reading periods and deletes the read data frame from the buffer; and an abnormality determiner that determines that the data frame is abnormal when the number of data frames written into the buffer and not deleted yet from the buffer exceeds a given threshold or when the data frame is written in excess of a capacity of the buffer.

This electronic control unit can reduce a load associated with abnormality detection, by: simply performing a data frame abnormality determination using a buffer which temporarily stores a received data frame.

Embodiments will be described below specifically. In the description of embodiments, like reference signs are used to refer to like parts. The below-described embodiments are examples and combinable.

First Embodiment

Figure 1:
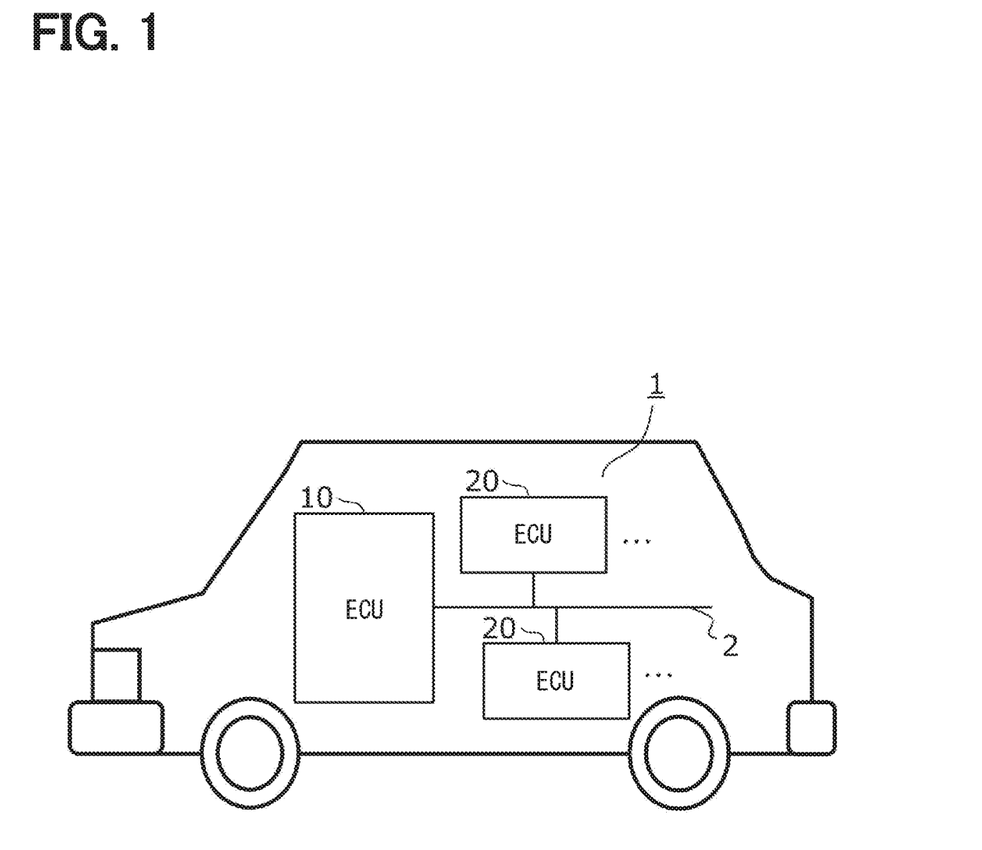
FIG. 1 is a diagram illustrating an in-vehicle system including ECUs of first to third embodiments.

FIG. 1 illustrates an in-vehicle system 1 including an ECU 10, a plurality of ECUs 20, and a communication network 2 connecting these ECUs to each other. In embodiments described below, the ECU 10 configured as a gateway receives data frames transmitted from the ECUs 20 and performs a series of the below described abnormality determinations. However, the ECU 10 of embodiments is not limited to an ECU serving as a gateway. The ECU 10 of embodiments may be arranged in the in-vehicle system 1 as an ECU dedicated to abnormality determination for example.

The communication network 2 may use such communication standards as, for example, CAN (Controller Area Network), LIN (Local Interconnect Network), Ethernet (registered trademark), Wi-Fi (registered trademark), and any other suitable communications. In the below examples, the communication network 2 uses CAN.

The ECU 20 transmits a data frame at given transmission periods (in other words, at given transmission intervals). In the below description, the ECU 20 is referred to as "transmission source ECU". The data frame that the transmission source ECU 20 transmits at the given periods may contain various data detected by a sensor or the like mounted to the vehicle and/or a control value for vehicle control.

Herein, the transmission source ECU 20 refers to an apparatus that transmits a data frame. For example, the transmission source ECU 20 may refer to an apparatus that generates a data frame and transmits the data frame. Alternatively, the transmission source ECU 20 may refer to an apparatus that that acquires a data frame and transmits the data frame. Alternatively, the transmission source ECU 20 may refer to an apparatus that generates a data frame and transmits the data frame, and that acquires a data frame and transmits the data frame.

Figure 2:
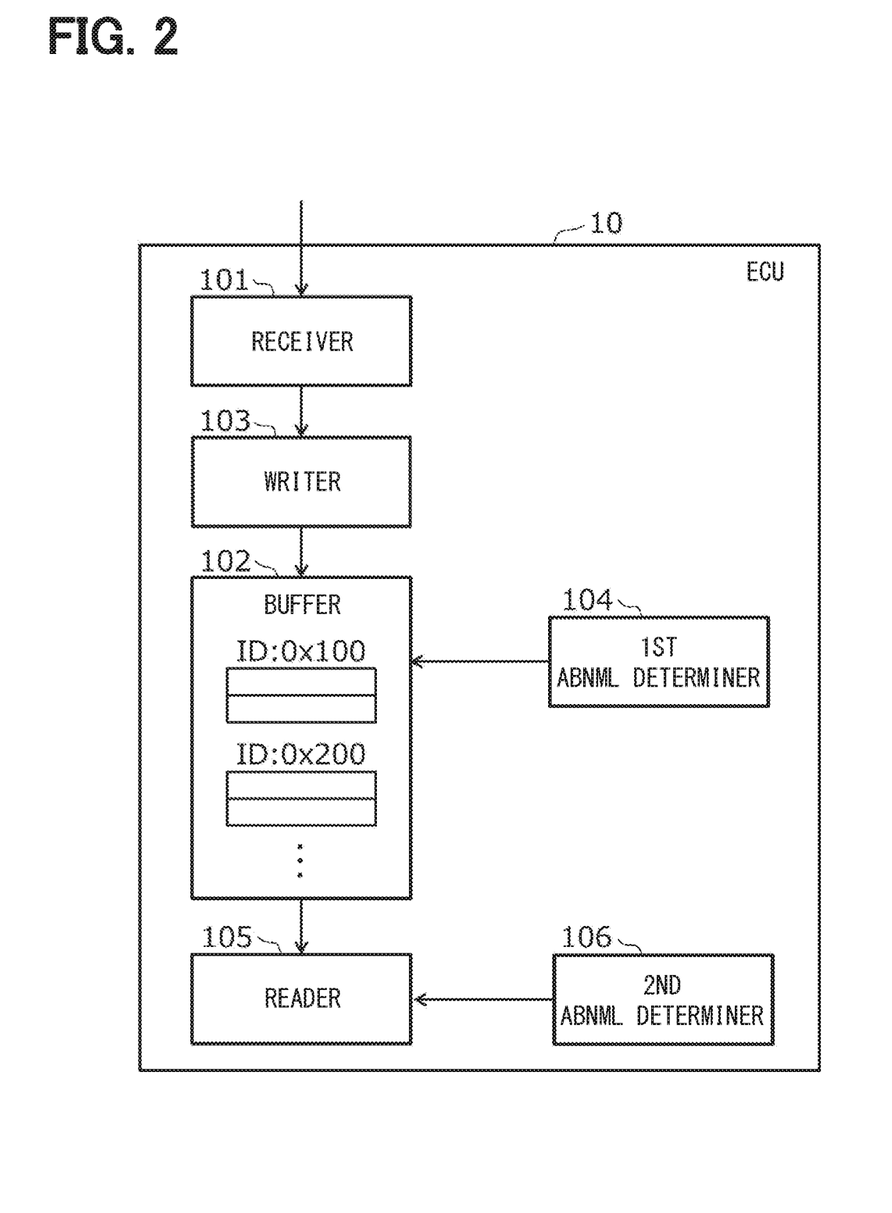
FIG. 2 is a block diagram illustrating an ECU of a first embodiment.

FIG. 2 illustrates a configuration of the ECU 10. The ECU 10 includes a receiver 101, a buffer 102, a writer 103, a first abnormality determiner 104, a reader 105, and a second abnormality determiner 106.

The receiver 101 receives the "data frame" transmitted at the "given" transmission periods from the transmission source ECU 20 connected via the CAN.

Herein, the term "given" may include "always constant". The term "given" may include "uniquely determined according to condition" in some cases. The term "data frame" may refer to data generated in a given format, and is not limited to what is called a frame. For example, the data frame may include what is called a data packet and what is called a data block.

The buffer 102 includes a volatile memory such as a DRAM and an SRAM, and can temporarily store the data frame received by the receiver 101. In cases where the receiver 101 receives data frames having a plurality of different CAN-IDs, the buffer 102 stores the data frame for each CAN-ID (on a CAN-ID-by-CAN-ID basis), as illustrated in FIG. 2. Further, the upper limit of the number of data frames storable in the buffer 102 may be preset for each CAN-ID (on a CAN-ID-by-CAN-ID basis).

The writer 103 "writes" the received data frame into the buffer 102 each time the receiver 101 receives the data frame. In that regard, when there is no enough capacity of the buffer 102 to write a new data frame into the buffer 102, specifically, when the data frames are already stored up to the upper limit of the number of data frames storable in the buffer 102 and the buffer 102 is full, the new data frame is not written into the buffer 102 even when the writer 103 performs a data frame writing process.

Executing a data frame writing process to the buffer by the writer is a sufficient condition for establishing the "writing" into the buffer, and it does not matter whether the data frame is stored in the buffer as a result of writing the data frame into the buffer.

The first abnormality determiner 104 determines that the data frame is abnormal when the number of data frames written into the buffer 102 exceeds a given threshold. Herein, the threshold used as a criterion for the abnormality determination on the data frame by the first abnormality determiner 104 is set based on a maximum number of times the receiver 101 receives, within a reading period of the reader 105, the data frame transmitted at the given transmission periods from the transmission source ECU 20, wherein the reader 105 reads the data frame from the buffer 102 at the reading periods. For example, in the case of the reading period of 10 msec and the transmission period of 5 msec, the maximum number of data frames that the receiver 101 is supposed to receive within 10 msec is considered to be three even in cases where the data frame transmission/reception period is disturbed due to congestion in the communication network. Therefore, the threshold is set to three. It is noted that the values of the reading period, the transmission period, and the threshold described above are merely examples, and the values are not limited to these examples. Further, the thresholds having different values may be set for different CAN-IDs.

The first abnormality determiner 104 further determines that the data frame is abnormal, when the data frame is written in excess of the capacity of the buffer 102, that is, in excess of the number of data frames storable in the buffer. Like the threshold, the capacity of the buffer 102 is set based on the maximum number of times the receiver 101 receives, within the reading period of the reader 105, the data frame transmitted at the given transmission periods from the transmission source ECU 20. For example, the capacity of the buffer 102 may be set to a value obtained by multiplying the size of the data frame by the maximum number. In this case, the number of data frames storable in the buffer 102 is equal to the above-mentioned given threshold. Alternatively, the capacity of the buffer 102 may be set to a given numerical value plus a value that is obtained by multiplying the size of the data frame by the maximum number, thereby providing a margin to the capacity of the buffer 102. In such a configuration, the value to be added to the value obtained by multiplying the size of the data frame by the maximum number may be a variable that is changed according to the congestion of the communication network or the like.

The first abnormality determiner 104 counts the number of data frames written by the writer 103 into the buffer 102, or counts the number of data frames read by the reader 105 from the buffer 102; thereby, the first abnormality determiner 104 can count the number of data frames. In this case, since it may be necessary to count all of the received data frames, this causes a load on the ECU. Therefore, in the timing of, for example, the reader 105 reading the data frame, the first abnormality determiner 104 determines the number of data frames based on a difference between an address indicating a location to write the next data frame into the buffer 102 and an address indicating a location to read the data frame from the buffer 102.

Figure 3A:
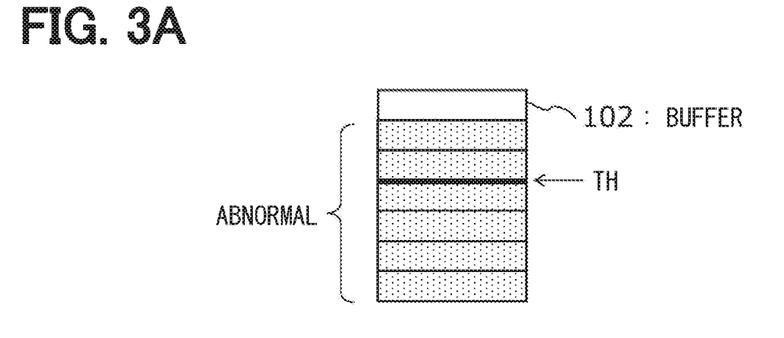
FIG. 3A is a diagram illustrating abnormality determination by a first abnormality determiner.
Figure 3B:
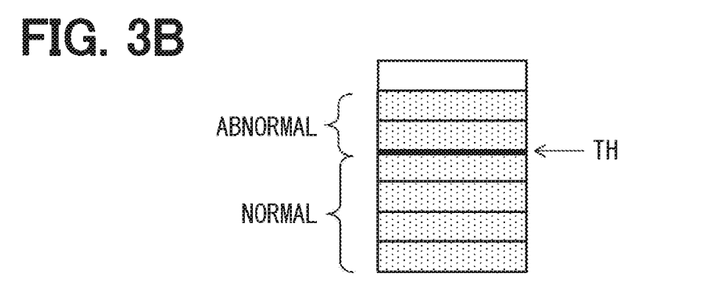
FIG. 3B is a diagram illustrating abnormality determination by a first abnormality determiner.
Figure 3C:
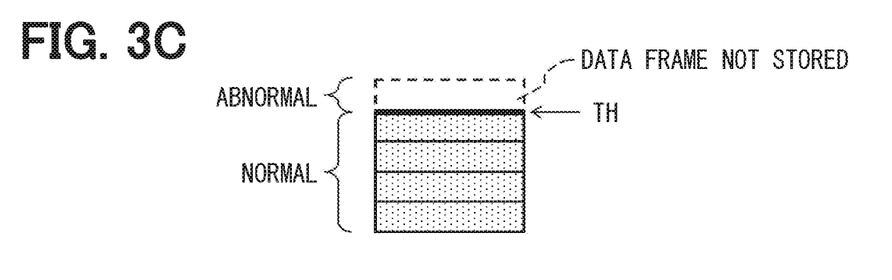
FIG. 3C is a diagram illustrating abnormality determination by a first abnormality determiner.

FIGS. 3A to 3C are diagrams for explaining abnormality determination by the first abnormality determiner 104. In FIGS. 3A to 3C depicting the buffer 102, the diagonal lines mean that the data frame is stored in the buffer 102. In addition, the threshold is set to four in the examples of FIGS. 3A to 3C.

FIGS. 3A and 3B illustrate states in which six data frames are stored in the buffer 102 capable of storing seven data frames. In the example of FIG. 3A, the first abnormality determiner 104 determines that all of the six data frames stored in the buffer 102 are abnormal. Alternatively, the first abnormality determiner 104 may determine that the data frames written into the buffer by the writer after the number of data frames stored in the buffer exceeds the threshold are abnormal. FIG. 3B illustrates this example where it is determined that the four data frames written before the threshold is exceeded are normal, and the two data frames written after the threshold is exceeded are abnormal.

FIG. 3C illustrates a state in which the number of data frames storable in the buffer is equal to the threshold and four data frames are stored in the buffer 102. In the case of FIG. 3C, as in the case of FIG. 3B, it is determined that the four data frames written before the threshold is exceeded are normal. In addition, the data frame written after the threshold is exceeded is not stored in the buffer 102 and is determined as abnormal. In FIG. 30, the data frame written after the threshold is exceeded is depicted by the broken lines.

In each example illustrated in FIGS. 3A to 30, the threshold is set to 4. For each example illustrated in FIGS. 3A to 30, the threshold may be set to 1 or more. Additionally, the threshold may be set to 0 for data frames having a particular CAN-ID. The threshold of 0 indicates that the maximum number of times the receiver 10 receives, within the reading period of the reader 105, the data frame transmitted at the given transmission periods is zero. For example, in cases where the receiver 101 receives data frames having a particular CAN-ID aperiodically, the threshold for the data frame corresponding to the particular CAN-ID is set to 0. Since such a data frame is always determined as abnormal by the first abnormality determiner 104, the data frame is subject to an abnormality detection process performed by the second abnormality determiner 106 described later.

The reader 105 reads all of the data frames stored in the buffer 102 at the given reading periods, and deletes the read data frames from the buffer 102.

The second abnormality determiner 106 makes a data frame abnormality determination by performing the abnormality detection process on the data frame that is not determined as abnormal by the first abnormality determiner 104. A manner of the abnormality detection by the second abnormality determiner 106 is not limited to a particular manner and various manners are employable. For example, the second abnormality determiner 106 performs abnormality detection using a message authentication code. In this case, a shared key is previously shared between the ECU 10 and the transmission source ECU 20. The transmission source ECU 20 transmits a MAC (Message Authentication Code) value being a hash value obtained by applying the shared key to data of the frame data, and a comparison is made between a MAC value obtained by the ECU 10 in the same manner and the MAC value transmitted from the transmission source ECU 20. When the MAC values are different, an abnormality is detected. In another manner, the second abnormality determiner 106 may calculate the interval of reception of respective data frames based on time stamps given to the respective data frames, and detects the abnormality when the calculated reception interval exceeds a given interval.

The abnormality detection manner including calculating the MAC value or the reception interval has a high processing load. In this regard, in the present embodiment, this kind of abnormality detection process having the high processing load is performed only on the data frame that is determined by the first abnormality determiner 104 as not abnormal. Thus, it is possible to suppress the processing load on the ECU 10 by omitting the abnormality detection process on the data frame that is determined as clearly abnormal by the first abnormality determiner 104.

When the first abnormality determiner 104 or the second abnormality determiner 106 determines that the data frame is abnormal, a log indicating that the abnormality has been detected is recorded. Instead of or in addition to recording the log, the data frame determined as abnormal may be discarded.

Figure 4:
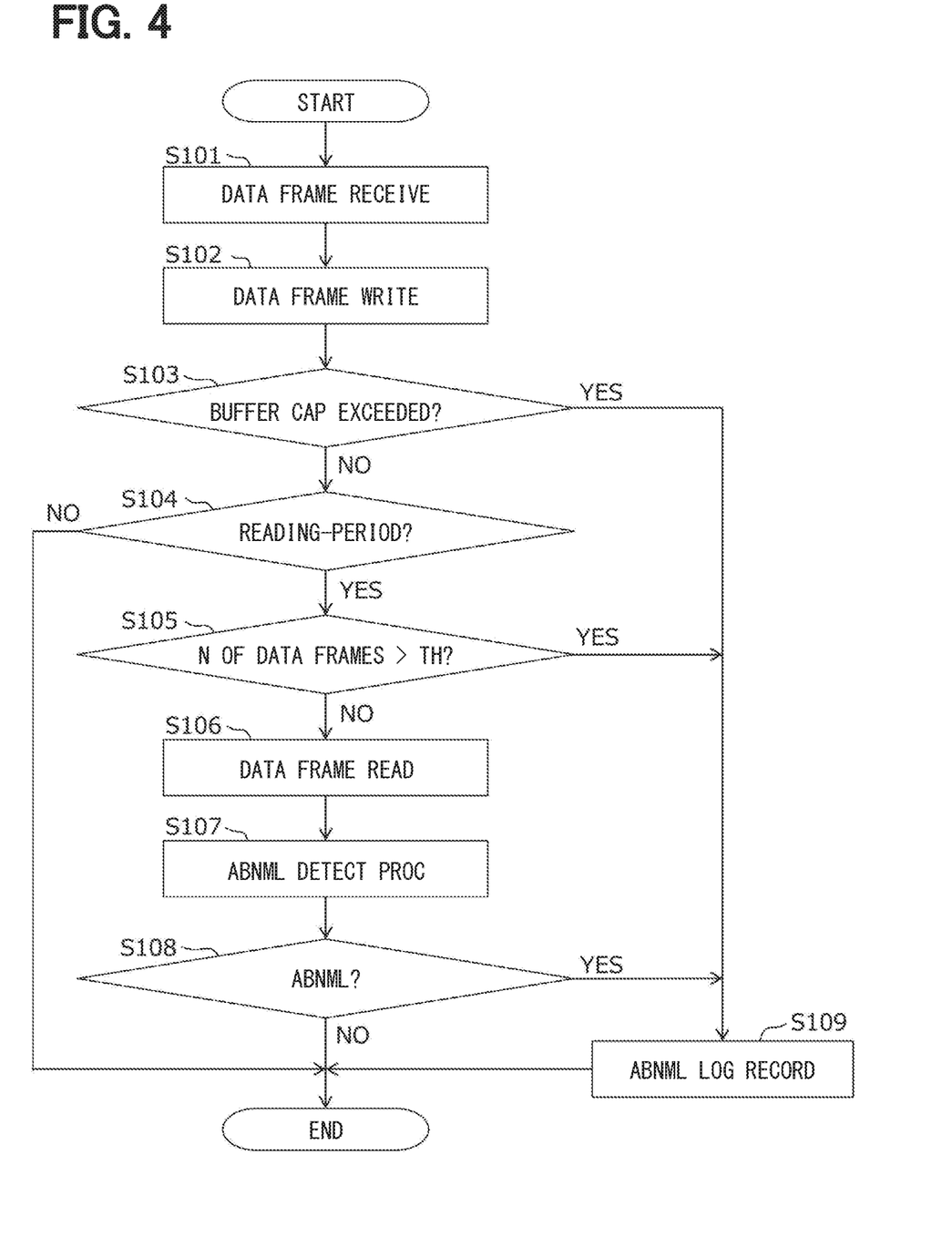
FIG. 4 is a diagram illustrating operation of an ECU.
Figure 6:
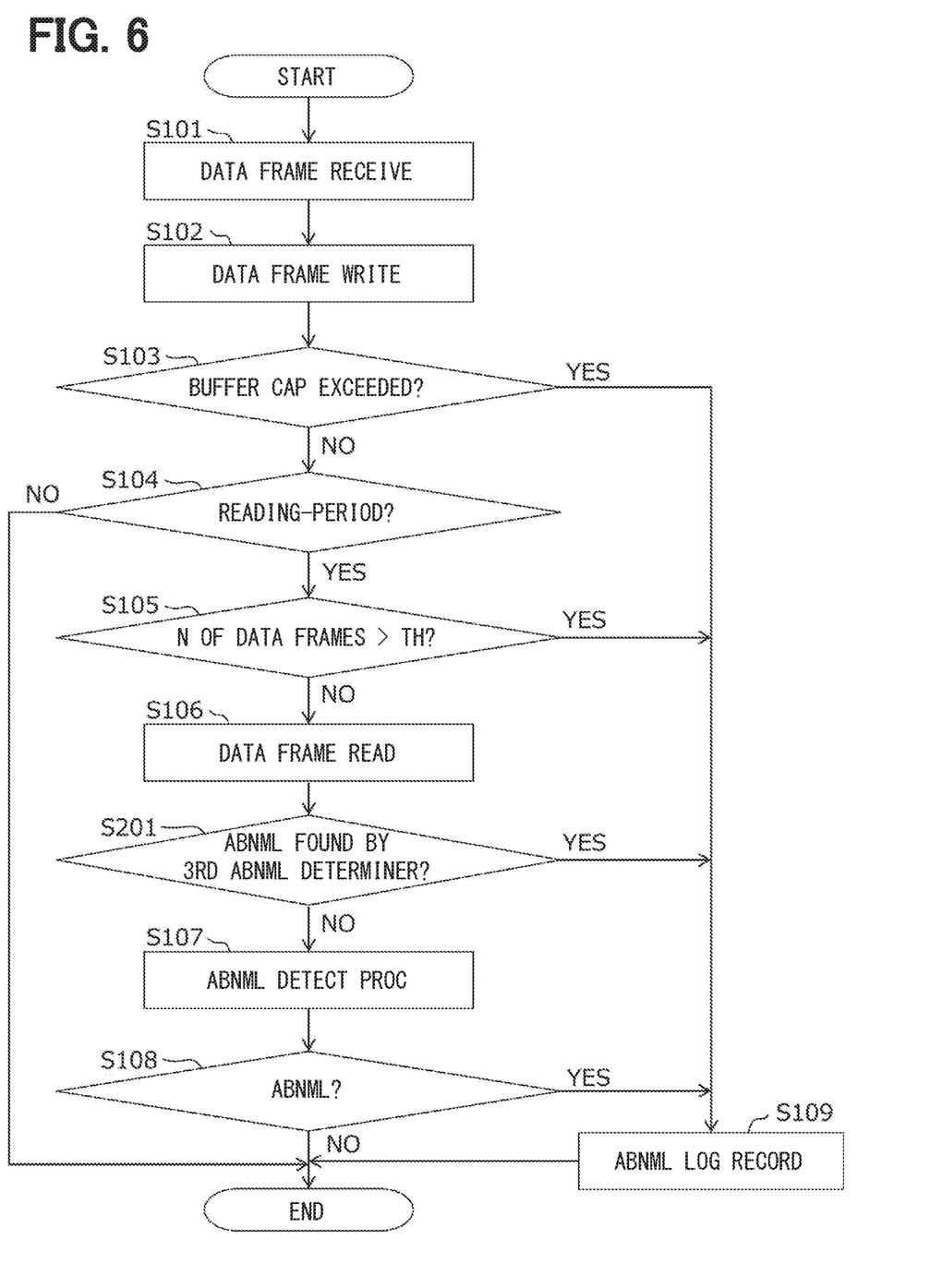
FIG. 6 is a diagram illustrating operation of an ECU.

Next, operation of the ECU 10 will be described with reference to FIG. 4. FIG. 4 and below-described FIG. 6 are to be understood as illustrating not only how the ECU 10 performs data frame abnormality determinations but also processing flows of programs executed by the ECU 10. The processing illustrated in each of FIGS. 4 and 6 is repeatedly executed each time the ECU 10 receives a data frame. It should be noted that the order of the processes illustrated in FIGS. 4 and 6 can be appropriately changed unless a certain process is a prerequisite for a subsequent process.

In S101, the receiver 101 receives the data frame transmitted at the given transmission periods from the transmission source ECU 20.

In S102, the data frame received in S101 is written into the buffer 102.

In S103, it is determined whether the data frame is written in excess of the capacity of the buffer 102. When it is determined that the data frame is written in excess of the capacity of the buffer 102, corresponding to YES at S103, the process proceeds to S109 where the first abnormality determiner 104 determines that the data frame is abnormal, and records a log indicating that the abnormal data frame has been received. When it is determined that the data frame is written without excess of the capacity of the buffer 102, corresponding to NO at S103, the process proceeds to S104.

In S104, it is determined whether the time corresponding to the given reading period of the reader 105 comes. When the time comes, corresponding to YES at S104, the process proceeds to S105.

In S105, the number of data frames written into the buffer 102 is compared with the given threshold. When the number of data frames written into the buffer 102 exceeds the threshold, corresponding to YES at S105, the process proceeds to S109 where the first abnormality determiner 104 determines that the data frame is abnormal and records a log indicating that the abnormal data frame has been received. When the number of data frames is less than or equal to the threshold, corresponding to NO in S105, the process proceeds to S106.

In S106, the data frame stored in the buffer 102 is read, and the read data frame is deleted from the buffer 102.

In S107, the abnormality detection process is performed on the data frame read from the buffer 102. When the abnormality is detected and it is determined that the data frame is abnormal, corresponding to YES at S108, the process proceeds to S109 where a log indicating that the abnormal data frame has been received is recorded. When it is not determined that there is an abnormality, corresponding to NO at S108, the process is ended.

As described above, the ECU 10 of the present embodiment makes a two-step abnormality determination on data frames. In the first abnormality determination, the abnormality determination is performed using the buffer 102. The second abnormality determination is performed such that the abnormality detection process having a high processing load is performed only on the data frame that is not determined as abnormal by the first abnormality determination. With such a configuration, it is possible to reduce the load of the abnormality detection process by limiting the data frame subject to the abnormality detection process.

Second Embodiment

An ECU in the second embodiment further includes an abnormality determiner in addition to the configuration of the above-described first embodiment.

Figure 5:
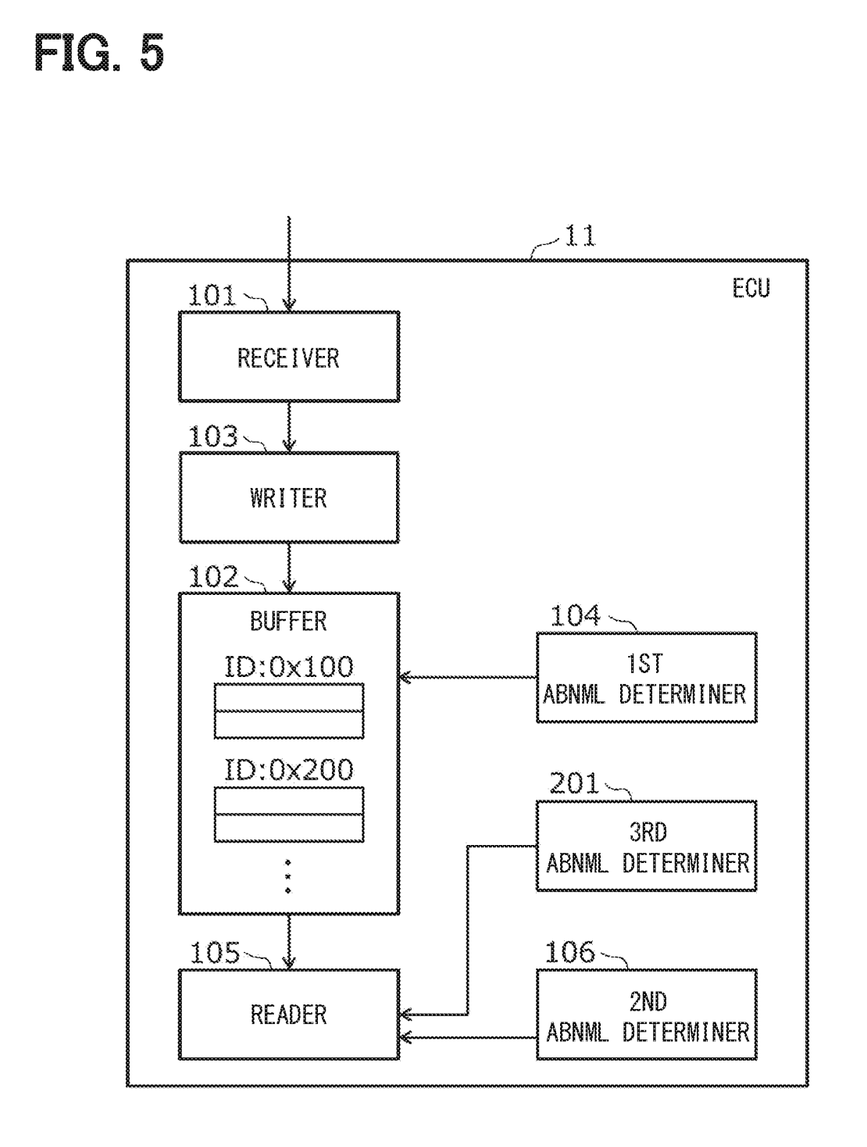
FIG. 5 is a block diagram illustrating an ECU of a second embodiment.

FIG. 5 illustrates the ECU 11 of the second embodiment. The ECU 11 differs from the ECU 10 in that the ECU 11 includes a third abnormality determiner 201. It is noted that, of the components illustrated in FIG. 5, the description of the same or similar components as those in FIG. 2 will omitted for avoiding redundant description.

In a manner different than the first abnormality determiner 104, the third abnormality determiner 201 performs abnormality determination on the data frame that is not determined as abnormal by the first abnormality determiner 104. For example, when the total of the number of data frames read by the reader 105 within a given time span exceeds a given threshold (also called a total threshold), the third abnormality determiner 201 determines that the data frame is abnormal. The given time span is set in advance. The given time span in this case is longer than the reading period being a period (in other words, interval) of the data frame reading by the reader 105. At periods corresponding to the reading periods, the third abnormality determiner 201 makes the abnormality determination. It is noted that as long as the manner of the abnormality determination by the third abnormality determiner 201 is different from those by the first and second abnormality determiners, the third abnormality determiner 201 may make the abnormality determination in any manners. It may be preferable that the abnormality determination by the third abnormality determiner 201 be higher in accuracy than that by the first abnormality determiner 104, and that the abnormality determination by the third abnormality determiner 201 be lower in processing load than that by the second abnormality determination 106.

The second abnormality determiner 106 of the present embodiment determines whether the data frame is abnormal, by performing the abnormality detection process on the data frame that is not determined as abnormal by the third abnormality determiner 201. Specifically, the second abnormality determiner 106 of the present embodiment performs the abnormality detection process only on the data frame that is not determined as abnormal by both the first abnormality determiner 104 and the third abnormality determiner 201. Therefore, the number of data frames subject to the abnormality detection process is reducible as compared with the first embodiment.

With reference to FIG. 6, an example of operation of the ECU 11 of the present embodiment will be described. The same processes as those in FIG. 4 are designated by the same reference signs, and the description thereof will be omitted for avoiding redundant description. In FIG. 6, a process of S201 is added to the flowchart of FIG. 4.

In the present embodiment, when the reader 105 reads the data frame in S105, the process proceeds to S201. In S201, the third abnormality determiner 201 performs the data frame abnormality determination. When it is determined that the data frame is abnormal, corresponding to YES at S201, a log indicating that the abnormal data frame has been received is recorded in S109. When it is not determined that there is an abnormality, corresponding to NO at S201, the second abnormality determiner 106 performs the abnormality detection process in S107.

Figure 7A:
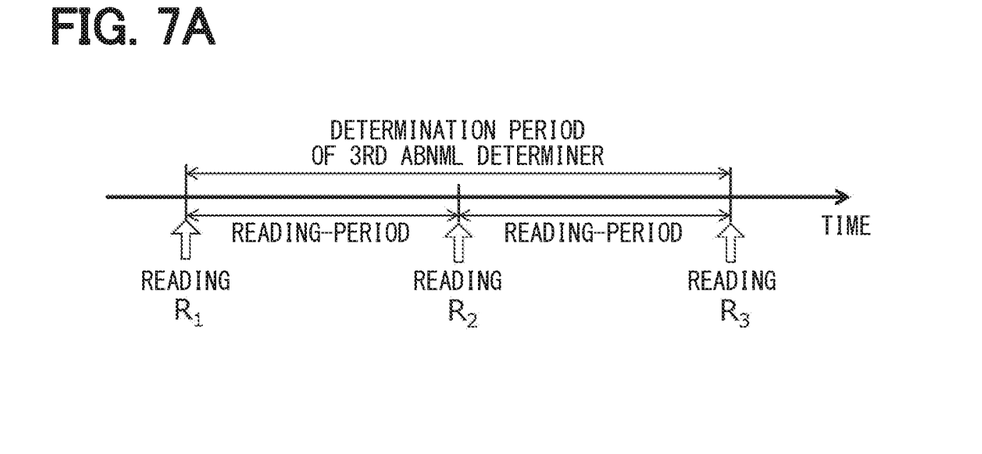
FIG. 7A is a diagram illustrating abnormality determination by a second abnormality determiner of the second embodiment.
Figure 7B:
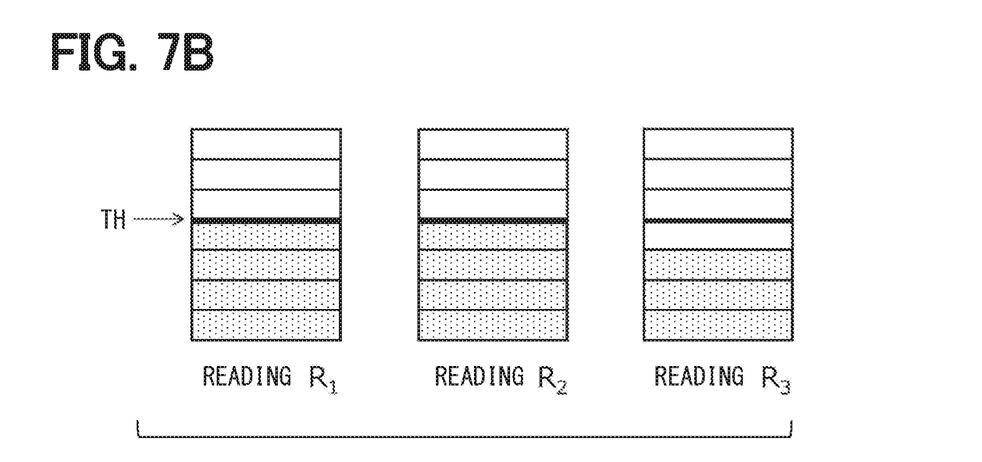
FIG. 7B is a diagram illustrating abnormality determination by a second abnormality determiner of the second embodiment.

FIGS. 7A and 7B are diagrams illustrating an example of abnormality determination by the third abnormality determiner 201. FIG. 7A illustrates a case where the third abnormality determiner 201 performs the abnormality determination at certain periods, wherein the certain period corresponds to twice the reading period. Further, FIG. 7B illustrates the data frames stored in the buffer 102 at a time of each of the reading processes R1, R2, and R3 illustrated in FIG. 7A.

Now, it is assumed that the total threshold is set to 10 in advance. When the number of data frames stored in the buffer 102 is less than or equal to the threshold as illustrated in FIG. 7B, the first abnormality determiner 104 determines that no data frame is abnormal. However, the total of the number of data frames read by the reading processes R1, R2, and R3 illustrated in FIG. 7A is 11 and exceeds the total threshold of 10. The third abnormality determiner 201 therefore determines that all of the data frames read by the reading processes illustrated in FIG. 7A are abnormal.

Figure 8A:
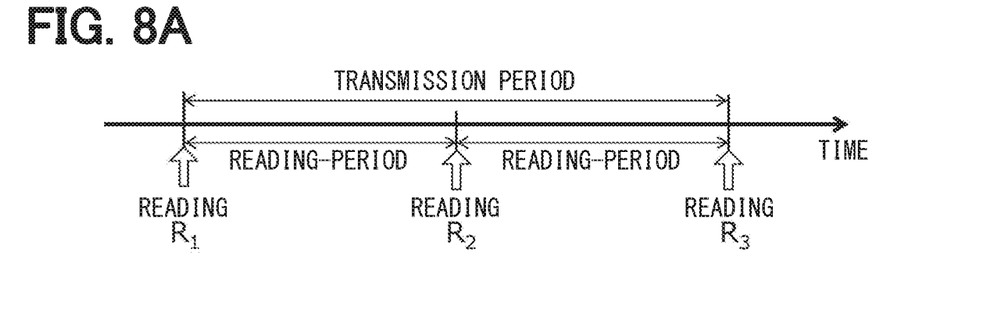
FIG. 8A is a diagram illustrating an example of abnormality determination by a second abnormality determiner of the second embodiment.
Figure 8B:
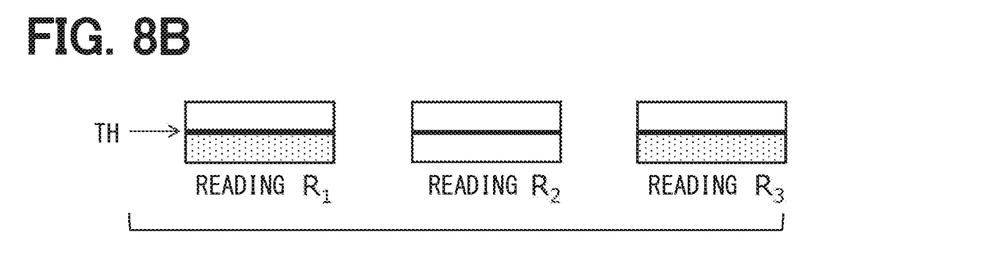
FIG. 8B is a diagram illustrating an example of abnormality determination by a second abnormality determiner of the second embodiment.
Figure 8C:
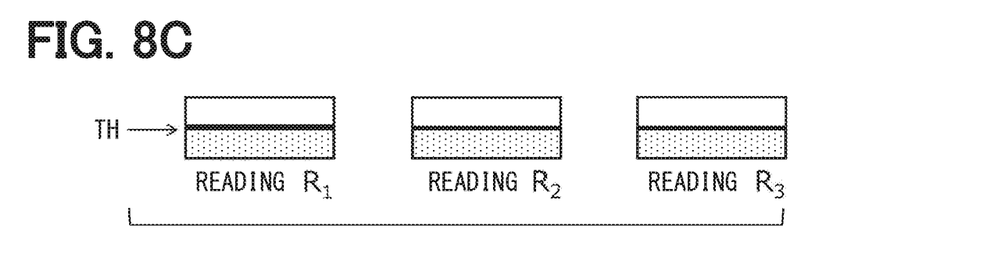
FIG. 8C is a diagram illustrating an example of abnormality determination by a second abnormality determiner of the second embodiment.

FIGS. 8A and 8B are diagrams illustrating another example of the abnormality determination by the third abnormality determiner 201. FIG. 8A illustrates a case where the reading period of the reader 105 for reading the data frame from the buffer 102 is one half of the transmission period of the transmission source ECU 20 for transmitting the data frame. In this case, it is unlikely that the data frame is read in a row. For example, as illustrated in FIG. 8B, it is highly likely that when the data frames are read by the reading process R1, no data frame is read by the next reading process R2 because no data frame is stored at the time of this reading process R2, and the data frame is read by the reading process R3 next to the reading process R3. Nevertheless, as illustrated in FIG. 8C, if the data frame is read in a row by the reading processes R1, R2, and R3, it is highly likely that there is a data frame abnormality. Therefore, in such a case, the third abnormality determiner 201 determines that the read data frame is abnormal. At this time, the third abnormality determiner 201 may determine that all of the data frames read in the row are abnormal. Alternatively, it may be determined that only the data frame read by the reading process in which no data frame is supposed to be read is abnormal. For example, it may be determined that the data frame read by the reading process R2 of FIG. 8C is abnormal. Note that FIGS. 8A to 8C describe an example in which the reading period is one half of the transmission period. However, in cases where the reading period is less than or equal to one half of the transmission period, the third abnormality determiner 201 can make the data frame abnormality determination in the above-described manner.

FIGS. 6 to 8C illustrate examples in which the third abnormality determiner 201 makes the abnormality determination on the data frame that is read by the reader. However, the third abnormality determiner 201 may make the abnormality determination on the data frame before the data frame is read from the buffer 102. For example, when the total number of data frames having different CAN-IDs stored in the buffer 102 exceeds a given total threshold, the third abnormality determiner 201 may determine that these data frames are abnormal.

Figure 9:
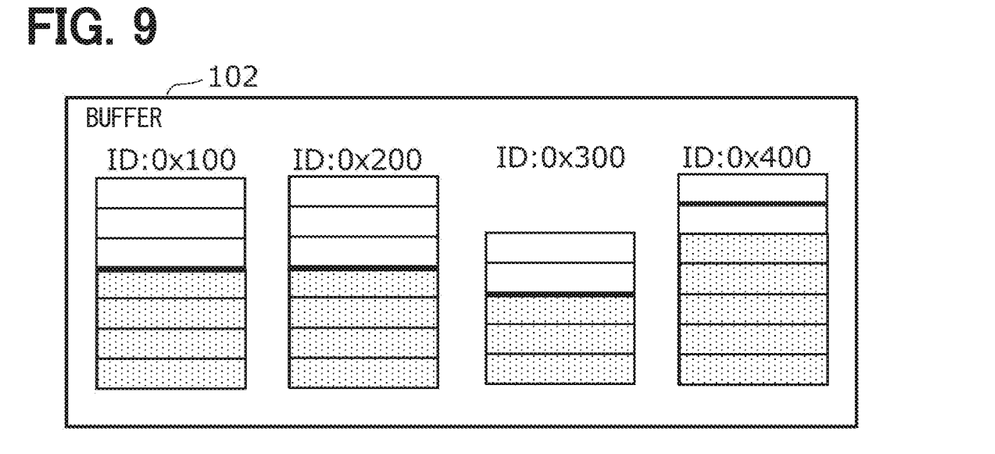
FIG. 9 is a diagram illustrating an example of abnormality determination by a second abnormality determiner of the second embodiment.

For example, FIG. 9 illustrates an example in which a plurality of data frames are stored in the buffer 102 for each CAN-ID. In the case of the configuration illustrated in FIG. 9, the receiver 101 receives the data frame having the CAN-ID of 0x100 ("first data frame") transmitted at specific transmission periods (corresponding to "first transmission periods), and further receives the data frames having the CAN-IDs of 0x200, 0x300, and 0x400 (corresponding to the "second data frames"). The transmission period (corresponding to second transmission period) of transmitting each of a data frame having the CAN-ID of 0x200, a data frame having the CAN-ID of 0x300, and a data frame having the CAN-ID of 0x400 from the transmission source ECU 20 may be equal to the first transmission period. Alternatively, the transmission periods of transmitting these data frames having different CAN-ID of 0x200, 0x300, and 0x400 from the transmission source ECU 20 may be different. Further, as illustrated in FIG. 9, the number of storable data frames and/or the threshold may differ among the CAN-IDs.

It is now assumed that the total threshold is set to 15 in advance. In the example of FIG. 9, the number of data frames having a respective CAN-ID is less than or equal to the corresponding threshold, and the first abnormality determiner 104 determines that no data frame is abnormal. However, the total of the number of data frames 0x100, the number of data frames 0x200, the number of data frames 0x300 and the number of data frames 0x400 stored in the buffer 102 is 16 and exceeds the total threshold. In this case, the third abnormality determiner 201 determines that all of the data frames stored in the buffer illustrated in FIG. 9 are abnormal.

As described above, the ECU 11 of the present embodiment makes a three-step abnormality determination on data frames. Between the first abnormality determination and the second abnormality determination illustrated in the first embodiment, the third abnormality determination is performed. Only the data frame not determined as abnormal by the third abnormality determination is subject to the abnormality detection process having the high processing load. Therefore, it is possible to further reduce a processing load of the abnormality detection process in the ECU.

Third Embodiment

In the first and second embodiments, the first abnormality determiner 104 or the third abnormality determiner 201 determines whether the data frame is abnormal, by comparing the number of data frames with the threshold. The present embodiment further generates a flag according to the number of data frames stored in the buffer 102 or the number of data frames read by the reader 105, and the first abnormality determiner 104 and the third abnormality determiner 201 perform abnormality determination based on the presence or absence of the flag. This configuration will be specifically described below.

Figure 10:
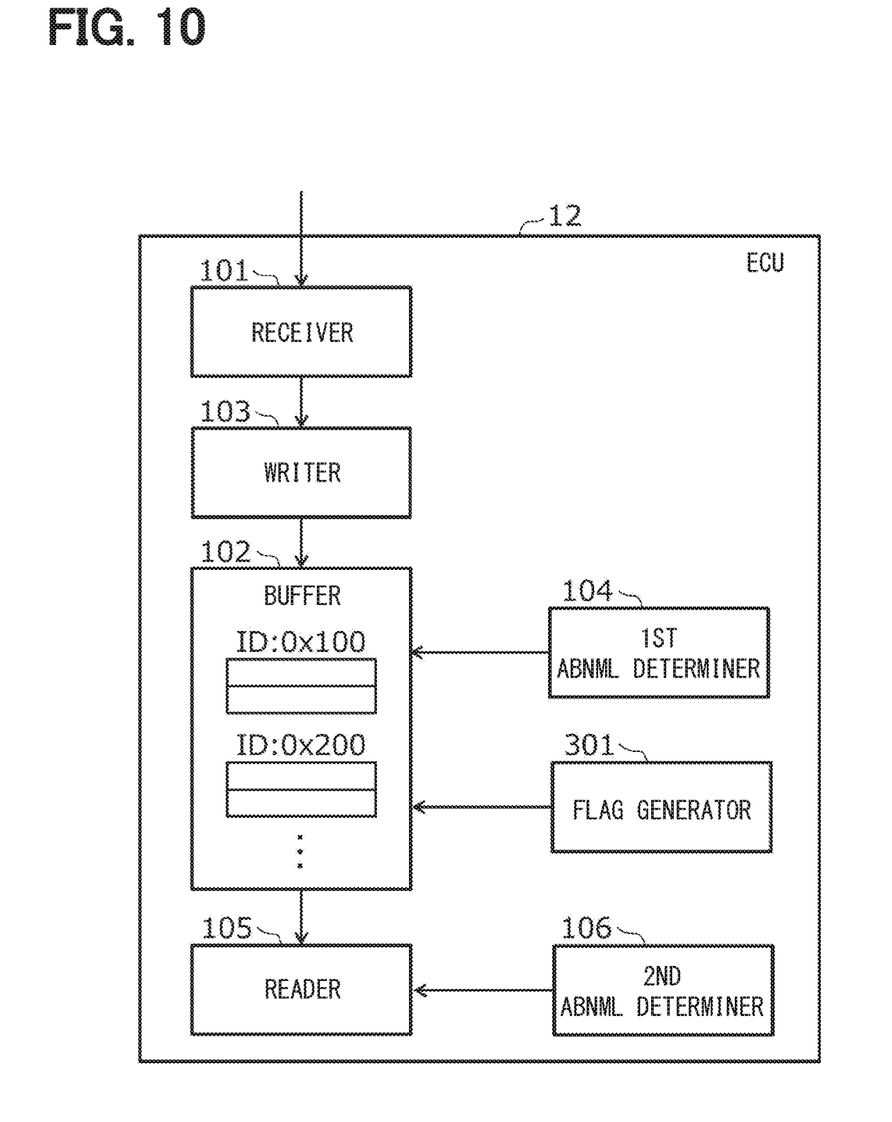
FIG. 10 is a block diagram illustrating an ECU of a third embodiment.

FIG. 10 illustrates an ECU 12 of the present embodiment. The ECU 12 includes a flag generator 301 in addition to the components of the ECU 10 illustrated in FIG. 2.

The flag generator 301 monitors the number of data frames stored in the buffer 102 and generates a flag when the number of data frames satisfies a given condition. The given condition in the present embodiment is set, for example, such that the number of data frames stored in the buffer 102 exceeds the threshold described in the first embodiment.

The first abnormality determiner 104 of the present embodiment determines whether there is the data frame abnormal, based on the presence or absence of the flag. Specifically, when the flag is generated by the flag generator 301, the first abnormality determiner 104 determines that there is the data frame abnormal.

The flag generator 301 may be configured to generate a flag when a condition different from the above-described condition is satisfied. For example, the given condition may be set to such a condition that the total of data frames having a plurality of different CAN-IDs stored in the buffer 102 exceeds the total threshold described in the second embodiment, and the flag generator 301 may generate the flag when this condition is satisfied. Alternatively, the flag generator 301 may monitor the number of data frames read by the reader 105 and generate the flag when the number of data frames read by the reader 105 satisfies a given condition. In this case, the given condition is set to, for example, such a condition that a total of the data frames read by the reader 105 within a given time span exceeds the total threshold described in the second embodiment, and the flag generator 301 may generate the flag when this condition is satisfied. In such a case, the second abnormality determiner 201 determines that there is the data frame abnormal when the flag is generated by the flag generator 301.

In the present embodiment, the first abnormality determiner 104 or the third abnormality determiner 201 can easily perform the abnormality determination based on the presence or absence of the flag, and it is possible to further reduce the load of the abnormality determination in the ECU.

The ECUs of embodiments have been described above.

The terms used in the embodiments are examples and may be replaced with terms having the same meanings or having the same functions.

The block diagrams used in the description of the embodiments include functional blocks of the ECU classified and organized by function, e.g., the writer, the reader, the first to third abnormality determiners and the flag generator. Because of function description, the block diagrams are disclosure of methods. The functional blocks and methods may be implemented by combinations of hardware components and/or software components. For example, the functional blocks and method may be implemented by a computer of the ECU comprising one or more processors such as a CPU and a hardware logic circuit, one or more memories such as a ROM and a RAM, an I/O, and a bus line connecting these components. Specifically, the blocks and methods may be implemented by a computer created by configuring a memory and a processor programmed to execute one or more particular functions embodied in computer programs. Alternatively, the blocks and methods may be implemented by a computer created by configuring a processor provided by one or more special purpose hardware logic circuits. Alternatively, the blocks and methods may be implemented by one or more computers created by configuring a combination of a memory and a processor programmed to execute one or more particular functions and a processor provided by one or more hardware logic circuits.

The arrangements of the functional blocks described in respective embodiments, which are also understood as the processes, flows, and methods, may be changed unless otherwise there is a constraint that the result of one step is used in another step.

The terms "first" and "second" in the present disclosure are used to distinguish between two or more configurations and methods of the same or similar kind, and do not limit the order or superiority or inferiority.

The computer programs may be provided to a storage medium of dedicated or general purpose hardware (e.g., external storage device (hard disk, USB memory, CID/BD etc.), internal storage device (RAM, ROM, etc.)) via a non-transitory storage medium. Alternatively, the computer programs may be provided to the storage medium of dedicated or general purpose hardware via a communication line from a server or the like, without via the non-transitory storage medium. These make it possible to provide latest features via program upgrades.

Although the ECU has been illustrated as a vehicle-mounted ECU for an automobile, the ECU is not limited to a vehicle use but is applicable to ECUs for various uses.

What is claimed is:

1. An electronic control unit comprising:
a receiver that receives a plurality of data frames transmitted at given transmission periods from a transmission source electronic control unit connected via a communication network;
a buffer that stores the plurality of data frames;
a writer that writes the plurality of data frames received by the receiver into the buffer;
a first abnormality determiner that determines that a particular data frame of the plurality of data frames received by the receiver is abnormal in response to determining that at least one of (i) the number of data frames written into the buffer exceeds a given threshold after writing the particular data frame into the buffer, or (ii) a capacity of the buffer would be exceeded by writing the particular data frame into the buffer;
a reader that reads each of the plurality of data frames stored in the buffer at given reading periods and deletes each data frame from the buffer once each data frame is read by the reader; and
a second abnormality determiner that performs an abnormality detection process to determine whether there is an abnormality in all data frames received by the receiver that are not already determined to be abnormal by the first abnormality determiner,
wherein:
the given threshold or the capacity is set based on a maximum number of data frames transmitted at the given transmission periods and received by the receiver during the reading period.

2. The electronic control unit according to claim 1, wherein:
when the number of data frames written into the buffer exceeds the given threshold, the first abnormality determiner determines that all of the data frames stored in the buffer before being deleted by the reader are abnormal.

3. The electronic control unit according to claim 1, wherein:
when the number of data frames written into the buffer exceeds the given threshold, the first abnormality determiner determines that only the particular data frame written into the buffer after the number of data frames exceeds the given threshold is abnormal.

4. The electronic control unit according to claim 1, wherein:
the number of data frames storable in the buffer is equal to the given threshold.

5. The electronic control unit according to claim 1, wherein:
the given threshold is zero.

6. The electronic control unit according to claim 1, further comprising:
a third abnormality determiner, wherein:
when the data frames stored in the buffer are not determined to be abnormal by the first abnormality determiner and a total of the number of data frames read by reader within a given time span that is longer than the reading period exceeds a total threshold, the third abnormality determiner determines that the data frames stored in the buffer are abnormal; and
the second abnormality determiner performs the abnormality detection process on each data frame stored in the buffer that is not determined to be abnormal by the third abnormality determiner.

7. The electronic control unit according to claim 1, wherein:
the reading period is less than or equal to one half of the transmission period,
the electronic control unit further comprising:
a third abnormality determiner,
wherein:
when the data frames stored in the buffer are not determined to be abnormal by the first abnormality determiner and are read by the reader in a row, the third abnormality determiner determines that the data frames are abnormal; and
the second abnormality determiner performs the abnormality detection process on each data frame stored in the buffer that is not determined to be abnormal by the third abnormality determiner.

8. The electronic control unit according to claim 1, wherein:
the plurality of data frames includes at least one first data frame transmitted at first transmission periods;
the receiver receives, in addition to the at least one first data frame, at least one second data frame transmitted at second transmission periods;
the buffer stores the at least one first data frame and the at least one second data frame; and
the first abnormality determiner determines whether the at least one second data frame is abnormal, in addition to determining whether the at least one first data frame is abnormal,
the electronic control unit further comprising
a third abnormality determiner,
wherein:
when the at least one first data frame and the at least one second data frame are not determined to be abnormal by the first abnormality determiner, a total of the number of the at least one first data frame stored in the buffer and the number of at least one second data frame stored in the buffer exceeds a given total threshold, the third abnormality determiner determines that the at least one first data frame and the at least one second data frame are both abnormal; and
the second abnormality determiner performs the abnormality detection process on any data frame of the at least one first data frame and the at least one second data frame not determined to be abnormal by the third abnormality determiner.

9. The electronic control unit according to claim 1, further comprising
a flag generator that generates a flag when the number of data frames stored in the buffer exceeds the given threshold,
wherein:
when the flag is generated, the first abnormality determiner determines that the particular data frame is abnormal.

10. The electronic control unit according to claim 1, wherein
the transmission source electronic control unit is one of a plurality of transmission source electronic control units connected via the communication network, each of the transmission source electronic control units of the plurality of transmission source electronic control units transmits data frames of the plurality of data frames at respective given transmission periods,
the buffer stores the data frames of the plurality of data frames transmitted by each of the transmission source electronic control units, and
the reading period and the given threshold or the capacity are set for each of the transmission source electronic control units.

11. The electronic control unit according to claim 1, wherein
the first abnormality determiner determines, at every time point where the reader reads the data frame stored in the buffer, whether the number of data frames written into the buffer exceeds the given threshold or whether the capacity of the buffer would be exceeded, and
the first abnormality determiner records a log indicating reception of an abnormal data frame in response to determining that the particular data frame is abnormal.

12. The electronic control unit according to claim 1, wherein
the second abnormality determiner performs the abnormality detection process only in response to the first abnormality determiner determining that the particular data frame is not abnormal.

13. A non-transitory storage medium storing an abnormality determination program executed in an electronic control unit connected to a transmission source electronic control unit via a communication network, the program causing the electronic control unit to perform:
receive a plurality of data frames transmitted at given transmission periods from the transmission source electronic control unit;
writing the received plurality of data frames into a buffer;
determining, by a first abnormality determination, that a particular data frame of the plurality of data frames received is abnormal in response to determining that at least one of (i) the number of data frames written into the buffer exceeds a given threshold after writing the particular data frame into the buffer, or (ii) a capacity of the buffer would be exceeded by writing the particular data frame into the buffer;
reading each of the plurality of data frames stored in the buffer at given reading periods;
deleting each data frame from the buffer once each data frame is read; and
performing, by a second abnormality determination, an abnormality detection process to determine whether there is an abnormality in all data frames received that are not already determined to be abnormal by the first abnormality determination,
wherein:
the given threshold or the capacity is set based on a maximum number of data frames transmitted at the given transmission periods and received during the reading period.

14. An abnormality determination method executed in an electronic control unit connected to a transmission source electronic control unit via a communication network,
the method comprising:
receiving a plurality of data frames transmitted at given transmission periods from the transmission source electronic control unit;
writing the received plurality of data frames into a buffer;
determining, by a first abnormality determination, that a particular data frame of the plurality of data frames received is abnormal in response to determining that at least one of (i) the number of data frames written into the buffer exceeds a given threshold after writing the particular data frame into the buffer, or (ii) a capacity of the buffer would be exceeded by writing the particular data frame into the buffer;
reading each of the plurality of data frames stored in the buffer at given reading periods;
deleting each data frame from the buffer once each data frame is read; and
performing, by a second abnormality determination, an abnormality detection process to determine whether there is an abnormality in all data frames received that are not already determined to be abnormal by the first abnormality determination,
wherein:
the given threshold or the capacity is set based on a maximum number of data frames transmitted at the given transmission periods and received during the reading period.

15. An electronic control unit comprising:
a receiver that receives a plurality of data frames transmitted at given transmission periods from a transmission source electronic control unit connected via a communication network;
a buffer that stores the plurality of data frames;
a writer that writes the plurality of data frames received by the receiver into the buffer;
a reader that reads each of the plurality of data frames stored in the buffer at given reading periods and deletes each data frame from the buffer once each data frame is ready by the reader; and
an abnormality determiner that determines that a particular data frame of the plurality of data frames received by the receiver is abnormal in response to determining that at least one of (i) the number of data frames written into the buffer and not yet deleted from the buffer exceeds a given threshold after writing the particular data frame into the buffer, or (ii) a capacity of the buffer would be exceeded by writing the particular data frame into the buffer.

\* \* \* \* \*